United States Patent [19]

Baxter et al.

[11] Patent Number: 4,741,026

[45] Date of Patent: Apr. 26, 1988

[54] MESSAGE SIGNALING ARRANGEMENT BETWEEN A SWITCHING SYSTEM AND USER TERMINALS

[75] Inventors: Leslie A. Baxter, Little Silver; James R. Campbell, Oceanport, both of N.J.; Wayne A. Davidson, Wheaton, Ill.; Laura M. Fandre, Naperville, Ill.; Robert M. Lund, Batavia, Ill.; Ronald W. Michelsen, St. Charles, Ill.; Nicholas P. Palumbo, Old Bridge, N.J.; Gerald S. Soloway, Holmdel, N.J.; Barry J. Weinbaum, Old Bridge, N.J.

[73] Assignees: American Telephone and Telegraph Company, AT&T Bell Laboratories, Murray Hill; AT&T Information Systems, Holmdel, both of N.J.

[21] Appl. No.: 868,650

[22] Filed: May 29, 1986

[51] Int. Cl.⁴ ............................................. H04M 3/56
[52] U.S. Cl. ..................................... 379/204; 379/158
[58] Field of Search ............... 379/202, 203, 204, 205, 379/206, 201, 157, 158, 165, 166; 370/62

[56] References Cited

U.S. PATENT DOCUMENTS

| | | | |
|---|---|---|---|
| 4,196,316 | 4/1980 | McEowen et al. | 379/157 X |
| 4,338,495 | 7/1982 | Bloch et al. | 379/157 X |
| 4,383,137 | 5/1983 | Aikawa et al. | 379/165 |
| 4,512,016 | 4/1985 | Fulcomer, Jr. et al. | 370/110.1 |
| 4,520,235 | 5/1985 | Morikawa et al. | 379/165 X |

OTHER PUBLICATIONS

"Digital Access Signalling System", *CCITT*, The International Telecommunication Union, vol. VI—Fascicle VI.9, Oct. 8-19, 1984, pp. 57-193.

*Primary Examiner*—James L. Dwyer
*Attorney, Agent, or Firm*—Ross T. Watland

[57] ABSTRACT

A signaling arrangement where all terminal configuration data is stored in a switching system, but where each user terminal responds to a message from the system, defining one of the user terminal buttons as the selected call appearance at the terminal, by operating in a functional signaling mode to communicate with the system using functional messages concerning a call at the selected call appearance. Idle and ringing preference methods for use in terminating calls and auto-drop and auto-hold alternatives for use when moving from one call appearance to another are disclosed as well as methods for holding or dropping calls. Implicit and explicit conferencing methods are also disclosed.

30 Claims, 14 Drawing Sheets

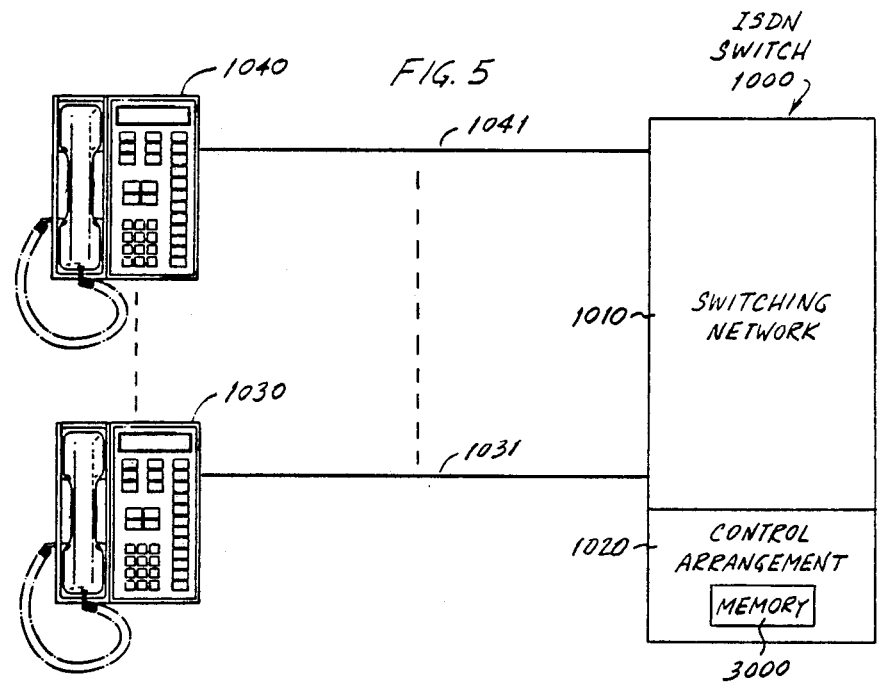
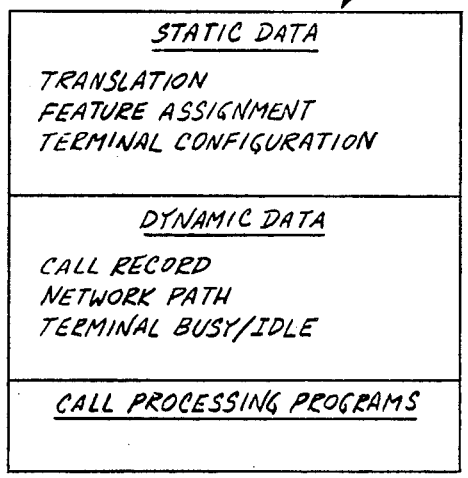

| TERMINAL 1030 | MESSAGE | SWITCH 1000 |
|---|---|---|
| Terminal is on-hook | | |
| BN#1 is a CA and is alerting CA#2 is selected | SETUP (CR=105,DA=1,SCA=2) ←———————— ALERT (CR=105) ————————→ | Terminate a call and indicate an idle SCA |
| Terminal goes off-hook | SETUP (CR=3,OCA=2,SWH=off) ————————→ | |
| | SETUP ACK (CR=3) ←———————— | Standard originating treatment |

Call Termination (Idle Preference)

*FIG. 8*

| TERMINAL 1030 | MESSAGE | SWITCH 1000 |
|---|---|---|
| Terminal is on-hook | | |
| BN#1 is a CA and is alerting CA#2 is selected | SETUP (CR=105,DA=1,SCA=2) ←———————— ALERT (CR=105) ————————→ | Terminate a call and indicate an idle SCA |
| Button request (user overides idle preference) | INFO (CR=null,FA=BN#1) ————————→ | |
| CA#1 is selected | INFO (CR=null,SCA=1) ←———————— | Map BN#1 to a CA and indicate SCA |
| Terminal goes off-hook | CONN (CR=105,SWH=off) ————————→ | |
| | CONN ACK (CR=105) ←———————— | Standard connect treatment |

Call Termination (Idle Preference Override)

*FIG. 9*

| TERMINAL 1030 | MESSAGE | SWITCH 1000 |
|---|---|---|
| Terminal is on-hook | | |
| BN#1 is a CA, is alerting and selected | SETUP (CR=105,DA=1,SCA=1) ← | Terminate a call and indicate alerting SCA |
| | ALERT (CR=105) → | |
| Terminal goes off-hook | CONN (CR=105,SWH=off) → | |
| | CONN ACK (CR=105) ← | Standard connect treatment |

Call Termination (Ringing Preference)

FIG. 10

| TERMINAL 1030 | MESSAGE | SWITCH 1000 |
|---|---|---|
| Terminal is off-hook, CA#1 is active (CR=7) and selected | | |
| BN#2 requested | INFO (CR=null,FA=BN#2) → | Map BN#2 to a CA |
| | DISC (CR=7) ← | Network clears CA#1 (CR=7) |
| | REL (CR=7) → | |
| BN#2 is a CA and is selected (terminal is off-hook) | REL COM (CR=7,SCA=2) ← | Indicate BN#2 is SCA |
| | SETUP (CR=5,OCA=2) → | |
| | SETUP ACK (CR=5) ← | Standard originating treatment |

Auto-Drop Treatment

FIG. 11

| TERMINAL 1030 | MESSAGE | SWITCH 1000 |
|---|---|---|
| Terminal is off-hook, CA#1 is active (CR=7) and selected | | |
| | DISC (CR=7) ← | Far-end disconnect |
| | REL (CR=7) → | |
| CA#1 is null, no CA selected | REL COM (CR=7,SCA=null) ← | Indicate no SCA |
| Terminal goes on-hook | INFO (CR=null,SWH=on) → | |
| CA#1 selected | INFO (CR=null,SCA=1) ← | Indicate idle SCA |

Far End Disconnect

FIG. 12

| TERMINAL 1030 | MESSAGE | SWITCH 1000 |
|---|---|---|
| Terminal is off-hook, CA#1 is active (CR=7) and selected | | |
| Terminal goes on-hook | DISC (CR=7,SWH=on) → | |
| CA#1 is null and selected | REL (CR=7,SCA=1) ← | Indicate idle SCA |
| | REL COM (CR=7) → | |

Terminal Disconnect

FIG. 13

| TERMINAL 1030 | MESSAGE | SWITCH 1000 |
|---|---|---|
| Terminal is off-hook, CA#1 is active (CR=7) and selected | | |
| Hold requested | HOLD (CR=7) →  | |
| CA#1 is on hold, no CA selected | ← HOLD ACK (CR=7,SCA=null) | Accept hold and indicate no SCA |
| BN#1 requested | INFO (CR=null,FA=BN#1) → | |
| CA#1 is held and selected (terminal is off-hook) | ← INFO (CR=null,SCA=1) | Map BN#1 to a CA and indicate SCA |
| | RECONN (CR=7) → | |
| | ← RECONN ACK (CR=7) | Remove call from hold |

Hold

FIG. 14

| TERMINAL 1030 | MESSAGE | SWITCH 1000 |
|---|---|---|
| Terminal is off-hook, CA#1 is active (CR=7) and selected | | |
| Drop requested | DROP (CR=7) → | |
| | ← DISC (CR=7) | Clear CA#1 (no party to drop) |
| | REL (CR=7) → | |
| CA#1 is null and selected (terminal is off-hook) | ← REL COM (CR=7,SCA=1) | Indicate SCA (preference) |
| | SETUP (CR=13,OCA=1) → | |
| | ← SETUP ACK (CR=13) | Standard origination |

Drop (Not Controller of Conference)

FIG. 15

| TERMINAL 1030 | MESSAGE | SWITCH 1000 |
|---|---|---|
| Terminal is off-hook, CA#1 is active (CR=7) and selected | | |
| Drop requested | DROP (CR=7) → | |
| | ← DROP ACK (CR=7) | Drop last added party |

Drop (Controller of Conference)

FIG. 16

| TERMINAL 1030 | MESSAGE | SWITCH 1000 |
|---|---|---|
| Terminal is off-hook, CA#1 is active (CR=7) and selected | | |
| Conference requested | CONF (CR=7) → | |
| | ← HOLD ACK (CR=7,SCA=2) | Place CA#1 on hold, indicate SCA for second leg of conference |
| CA#2 is null and selected (terminal is off-hook) | SETUP (CR=61,OCA=2) → | |
| | Standard Origination | |
| | ← CONN (CR=61) | Second leg completed |
| Conference requested | CONF (CR=61) → | |
| | ← CONF ACK (CR=61, OCR=CR=7) | Conference completed to held call |
| DISC (CR=61) | ← DISC (CR=61) | |
| | REL (CR=61) → | |
| | ← REL COM (CR=61, SCA=1) | |
| | RECONN (CR=7) → | |
| | ← RECONN ACK (CR=7) | |

Implicit Conference (Merge to Held Call)

FIG. 17

| TERMINAL 1030 | MESSAGE | SWITCH 1000 |
|---|---|---|
| Terminal is off-hook, CA#1 is active (CR=7) and selected | | |
| Conference requested | CONF (CR=7) → | |
| | ← HOLD ACK (CR=7,SCA=2) | Place CA#1 on hold, indicate SCA for second leg of conference |
| CA#2 is null and selected (terminal is off-hook) | SETUP (CR=61,OCA=2) → | |
| | Standard Origination | |
| | ← CONN (CR=61) | Second leg completed |
| Conference requested | CONF (CR=61) → | |
| | ← CONF ACK (CR=61, OCR=CR=61) | Conference completed |
| | ← DISC (CR=7) | |
| | REL (CR=7) → | |
| | ← REL COM (CR=7) | |

Implicit Conference (Merge to Active Call)

*FIG. 18*

| TERMINAL 1030 | MESSAGE | SWITCH 1000 |
|---|---|---|
| Terminal is off-hook, CA#1 is active (CR=7) and selected | | |
| Hold requested | HOLD (CR=7) →  | |
| CA#1 is held, no CA selected | ← HOLD ACK (CR=7,SCA=null) | Place CA#1 on hold |
| BN#2 requested | INFO (CR=null,BN#2) → | |
| | ← INFO (CR=null,SCA=2) | Map BN#2 to a CA and indicate SCA |
| CA#2 is null and selected (terminal is off-hook) | SETUP (CR=61,OCA=2) → | |
| | Standard Origination | |
| | ← CONN (CR=61) | |
| Conference requested | CONF (CR=61,OCR=7) → | |
| | ← CONF ACK (CR=61, OCR=CR=7) | Conference completed |
| | ← DISC (CR=61) | |
| | REL (CR=61) → | |
| | ← REL COM (CR=61,SCA=1) | |
| | RECONN (CR=7) → | |
| | ← RECONN ACK (CR=7) | |

Explicit Conference (Merge to Other Call)

*FIG. 19*

| TERMINAL 1030 | MESSAGE | SWITCH 1000 |
|---|---|---|
| Terminal is off-hook, CA#1 is active (CR=7) and selected | | |
| Hold requested | HOLD (CR=7) → | |
| CA#1 is held, no CA selected | HOLD ACK (CR=7,SCA=null) ← | Place CA#1 on hold |
| BN#2 requested | INFO (CR=null,BN#2) → | |
| | INFO (CR=null,SCA=2) ← | Map BN#2 to a CA and indicate SCA |
| CA#2 is null and selected (terminal is off-hook) | SETUP (CR=61,OCA=2) → | |
| | Standard Origination | |
| | CONN (CR=61) ← | |
| Conference requested | CONF (CR=61,OCR=7) → | |
| | CONF ACK (CR=61, OCR=CR=61) ← | Conference completed |
| | DISC (CR=7) ← | |
| | REL (CR=7) → | |
| | REL COM (CR=7) ← | |

Explicit Conference (Merge to Current Call)

*FIG. 20*

Message Element Structure

MESSAGE SIGNALING ARRANGEMENT BETWEEN A SWITCHING SYSTEM AND USER TERMINALS

TECHNICAL FIELD

This invention relates to digital communication procedures and, more particularly, to message signaling protocols between digital telephone switching systems and associated customer station equipment.

BACKGROUND OF THE INVENTION

One of the very important changes taking place as digital technology is extended from digital switching systems to digital access lines serving fully digital user stations, is the replacement of traditional analog station signaling, involving, for example, the transmission and detection of analog signals representing on-hook and off-hook states, by digital signaling procedures where complete digital messages are exchanged to control calls.

Initially, such digital message signaling was of a type referred to as stimulus signaling where each message is either generated as a result of a single event at a user terminal or contains a basic instruction from the switching system to be executed by a user terminal. Examples of such stimulus messages include a message generated by a user terminal defining the activation of a particular button, and a message from the switch, instructing a user terminal to flash a given lamp. With stimulus signaling, all the intelligence giving meaning to the various user terminal events resides in the switch. The switch processes stimulus messages defining button activations by reading stored data defining, for example, that the activation of button number 8 at a given user terminal represents a request for a conference call or that button number 12 is a call appearance at the given terminal and its activation represents a preselection of that call appearance by a user prior to initiating a call. The activation of button number 8 and button number 12 at other user terminals may have completely different meanings. Placing all the intelligence concerning terminal configuration in the switch is desirable since all system users can be given identical terminals and the terminals can be configured in many ways to accommodate different user requirements.

Because of the incorporation of microprocessors in more sophisticated user terminal equipment, a second type of message signaling, referred to as functional signaling, has evolved which involves a degree of intelligent processing in its generation or analysis. With functional signaling, the switch and the user terminal communicate with each other as peers. The user terminal intelligence moves through a number of call states as the call progresses from origination to disconnection. The messages generated in response to events at the user terminal are context-dependent, i.e., the message generated in response to a given event depends on the user terminal call state. With functional signaling, the user terminal knows the meaning of user events such as the activation of call appearance and feature buttons, and sends appropriate functional messages to the switch in response to such events. For example, when a particular call appearance is activated at a user terminal that is off-hook and a destination directory number is subsequently entered, the user terminal may transmit a message requesting that the switch set up a call from the particular call appearance to the destination directory number. When a conference button is activated, the user terminal transmits a message requesting a conference call. The increased user terminal intelligence and the use of functional messages advantageously reduce the magnitude of call processing activity required of the switching system and facilitate the evolution of a wide variety of complex features. However, functional signaling systems do not have the terminal configuration flexibility afforded when all terminal configuration data resides in the switch as with stimulus signaling systems. With functional signaling, each user terminal must be individually programmed such that the terminal knows the meaning of the particular configuration of buttons at that terminal.

In view of the foregoing, a recognized need in the art exists for a message signaling arrangement that allows intelligent peer-level communication between a switching system and user terminals without having to store data defining terminal configuration in the individual terminals.

SUMMARY OF THE INVENTION

The aforementioned need is met and a technical advance is achieved in accordance with the principles of the invention in an exemplary signaling arrangement where all terminal configuration data is stored in the switch, but where a user terminal responds to a message from the switch, defining one of the user terminal buttons advantageously as the selected call appearance at the terminal, by operating in a functional signaling mode to communicate with the switch using functional messages concerning a call at the selected call appearance.

The method of the invention is used between a switching system and a user terminal in controlling calls to and from the terminal. The terminal has a number of buttons and is operable in a stimulus signaling mode and a functional signaling mode. The system stores data defining at least one of the buttons as a call appearance. In accordance with the method, the terminal operates in the stimulus signaling mode to communicate with the system using stimulus messages. At some point, the system transmits a message to the terminal defining the at least one call appearance button as the selected call appearance at the terminal. The terminal responds to the message by operating in the functional signaling mode to communicate with the system using functional messages concerning a call at the selected call appearance.

In accordance with an illustrative method for initiating calls, a user terminal responds to an activation of one of its buttons by transmitting a first message to the system defining the activated button. The system reads stored data to determine whether the activated button is a call appearance. Upon determining that the activated button is a call appearance, the system transmits a second message to the terminal defining the activated button as the selected call appearance at the terminal. In response to the second message, the terminal and the system exchange functional messages to initiate a call from the selected call appearance.

Calls can be terminated to a user terminal using either idle preference or ringing preference. With idle preference, the system responds to an incoming call by determining two idle call appearances and informing the terminal that the first determined appearance is the destination appearance and that the second determined appearance is the selected call appearance at the terminal. When the terminal subsequently goes off-hook, an outgoing call is initiated from the selected call appearance. Idle preference can be overridden if the first determined appearance button is activated before the terminal goes off-hook. The terminal transmits a stimulus message to the system defining the activated button. The system responds by reading stored data to determine whether the activated button is a call appearance. Upon determining that the activated button is a call appearance, the system transmits a stimulus message to the terminal acknowledging that the call is held and defining the activated button as the selected call appearance at the terminal. When the terminal subsequently goes off-hook, the terminal and the system exchange functional messages to terminate the call to the selected call appearance.

With ringing preference, the system only determines one idle call appearance in response to an incoming call and informs the terminal that the determined appearance is both the destination appearance and the selected call appearance at the terminal. When the terminal subsequently goes off-hook, the terminal and the system exchange functional messages to terminate the call to the selected call appearance.

When a terminal is off-hook and a call appearance button is active on a first call and is the selected call appearance at the terminal, the activation of a second call appearance button can result in the first call either being dropped or held. In the auto-drop alternative, the terminal responds to the activation of the second button by transmitting a first message to the system defining the activated button. The system responds by reading stored data to determine whether the activated button is a call appearance. Upon determining that the activated button is a call appearance, the system and the terminal exchange functional messages to disconnect the first call including a second message transmitted from the system to the terminal defining the activated button as the selected call appearance at the terminal. In response to the second message, the terminal and the system exchange functional messages to initiate a second call from the selected call appearance defined by the second message. With the auto-hold alternative, functional messages are exchanged to place the first call on hold rather than disconnecting it.

When the terminal is off-hook and a call appearance is active on a call and is selected at the terminal, the system responds to a far-end disconnection of the call by exchanging functional messages with the terminal to disconnect the call at the selected call appearance including a first message transmitted from the system to the terminal defining that none of the call appearances is selected at the terminal. The terminal responds to the first message and to an on-hook condition by transmitting a second message to the system defining the on-hook condition. The system responds to the second message by reading stored data to determine an idle one of the call appearances. The system then transmits a third message to the terminal defining the determined idle call appearance as the selected call appearance at the terminal.

When the terminal is off-hook and a call appearance is active on a call and is selected at the terminal, the terminal responds to an on-hook condition of the terminal by transmitting a first functional message to the system to disconnect the call. The system responds by reading stored data to determine an idle call appearance. The system and the terminal exchange functional messages to complete the disconnection of the call including a second functional message transmitted from the system to the terminal defining the determined idle call appearance as the selected call appearance at the terminal.

When the terminal is off-hook and a call appearance is active on a call and is selected at the terminal, the terminal responds to an activation of a HOLD button by transmitting a first functional message to the system requesting that the call be placed on hold. The system transmits a second functional message to the terminal acknowledging that the call is held and defining that none of the call appearances is selected at the terminal. The terminal responds to an activation of the previously active call appearance button by transmitting a first stimulus message to the system defining the activated button. The system reads stored data to determine whether the activated button is a call appearance. Upon determining that the activated button is a call appearance, the system transmits a second stimulus message to the terminal defining the activated button as the selected call appearance at the terminal. In response to the second stimulus message, the terminal and the system exchange functional messages to reconnect the call.

When the terminal is off-hook and a call appearance is active on a first call and is selected at the terminal, the terminal responds to an activation of a DROP button by transmitting a first functional message to the system requesting that the first call be dropped. The system responds to the first functional message by reading stored data to determine an idle call appearance. (The idle call appearance may be the call appearance for the call being dropped.) The system and the terminal exchange functional messages to disconnect the first call including a second functional message from the system to the terminal defining the idle call appearance as the selected call appearance at the terminal. In response to the second functional message, the terminal and the system exchange functional messages to initiate a second call from the selected call appearance defined by the second functional message.

Two types of conference signaling referred to as implicit conferencing and explicit conferencing are described herein. When the terminal is off-hook and a call appearance is active on a first call and is selected at the terminal, for implicit conferencing the terminal responds to an activation of a CONFERENCE button by transmitting a first functional message to the system requesting a conference. The system responds to the first functional message by placing the first call on hold and reading stored data to determine an idle call appearance. The system transmits a second functional message to the terminal defining the determined idle call appearance as the selected call appearance for the second leg of the conference. In response to the second functional message, the terminal and the system exchange functional messages to originate a second call from the determined call appearance. Once the second origination has been completed, the terminal responds to a second activation of the CONFERENCE button by exchanging functional messages with the system to merge the first and second calls to form the conference. The system also transmits functional messages to the terminal to disconnect the call at the other call appearance.

With explicit conferencing, the terminal responds to an activation of the HOLD button by transmitting a first functional message to the system requesting that the first call be placed on hold. The system responds by placing the first call on hold and transmitting a second functional message to the terminal defining that none of the call appearances is selected at the terminal. The terminal responds to the second functional message and to an activation of a second call appearance button by transmitting a first stimulus message to the system defining the activated button. The system responds to the first stimulus message by reading stored data to determine whether the activated button is an idle call appearance. Upon determining that the activated button is an idle call appearance, the system transmits a second stimulus message to the terminal defining the activated button as the selected call appearance at the terminal. The terminal responds to the second stimulus message by exchanging functional messages with the system to originate a second call from the selected call appearance defined by the second stimulus message. Once the second call origination has been completed, the terminal responds to an activation of the CONFERENCE button by exchanging functional messages with the system to merge the first and second calls to form a conference. The system also transmits functional messages to the terminal to disconnect the call at the other call appearance.

BRIEF DESCRIPTION OF THE DRAWING

A more complete understanding of the invention may be obtained from a consideration of the following description when read in conjunction with the drawing in which:

FIG. 5 is a diagram of an illustrative configuration of an ISDN switch and two exemplary ISDN terminals wherein the signaling method of the present invention may be used;

FIG. 6 is a diagram of a memory included in the switch of FIG. 5;

FIGS. 8 through 20 are message sequence diagrams for various illustrative call scenarios involving message signaling in accordance with the invention.

DETAILED DESCRIPTION

The principles of the present invention are described in the context of an integrated services digital network (ISDN) switch 1000 (FIG. 5). An integrated services digital network is defined as a network evolved from the telephony integrated digital network that provides end-to-end digital connectivity to support a wide range of services, including voice and non-voice services, to which users have access by a limited set of standard multipurpose customer interfaces. One example of ISDN switch 1000 is the integrated packet switching and circuit switching system disclosed in the allowed U.S. patent application No. 606,937 filed May 3, 1984, assigned to same assignee as the present invention and incorporated by reference herein. However the invention is also applicable where switch 1000 represents an interconnected network of switching systems. Switch 1000 includes a switching network 1010, which represents, in the above-referenced exemplary integrated packet switching and circuit switching system, a plurality of time-slot interchange units and a time-multiplexed switch to provide circuit-switched connections, and a plurality of packet switching units (interconnected via the time-slot interchange units and time-multiplexed switch) to provide packet-switched connections. Switch 1000 further includes control arrangement 1020 which represents the control portion of the above-referenced exemplary switching system, including a central control and a plurality of control units that intercommunicate via predetermined channels of the time-multiplexed switch and a control distribution unit.

Figure 4:
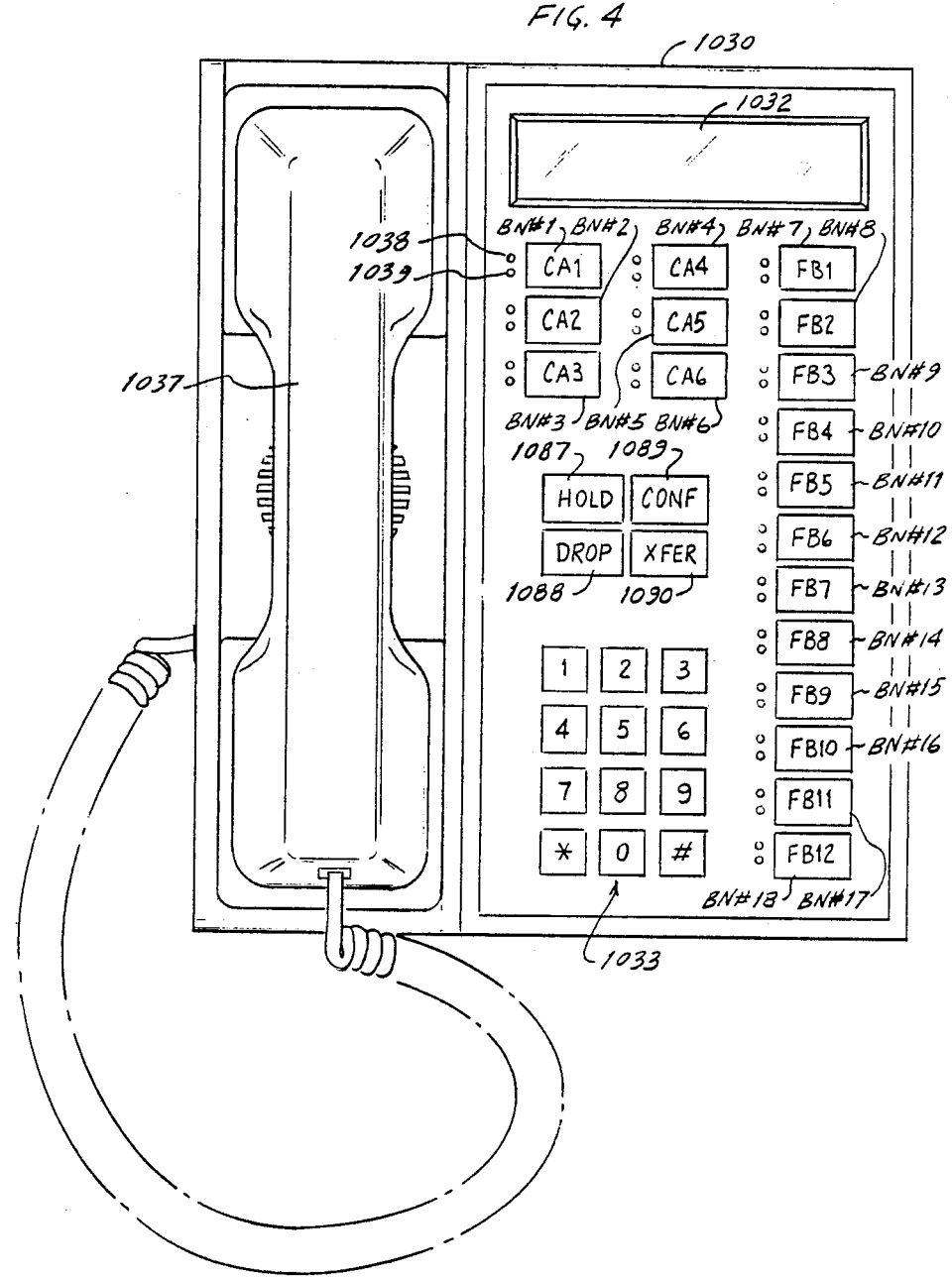
FIG. 4 is a more detailed diagram of the user terminal shown in FIGS. 1 through 3.

Also shown in FIG. 5 are two ISDN user terminals 1030 and 1040 which are connected to switch 1000 via associated user access lines (digital subscriber lines) 1031 and 1041. Although only two such terminals are explicitly shown, it is understood that switch 1000 interconnects a larger plurality of ISDN terminals and may interconnect conventional analog station sets as well. As shown in FIG. 4, ISDN user terminal 1030 includes a handset 1037, a telephone keypad 1033 and a display 1032 for visually displaying messages. Terminal 1030 also includes 22 buttons BN#1 through BN#18 and 1087 through 1090. In accordance with the present example, buttons 1087 through 1090 are only used for the HOLD, DROP, CONFERENCE and TRANSFER functions. The remaining buttons happen to be configured at terminal 1030 such that buttons BN#1 through BN#6 are call appearances and buttons BN#7 through BN#18 are feature buttons. Significantly, the identical terminal could be configured to meet different user requirements such that buttons BN#1 and BN#2 are call appearances and buttons BN#3 through BN#6 and BN#7 through BN#18 are feature buttons or such that buttons BN#1 through BN#6 and BN#7 through BN#15 are feature buttons and buttons BN#16 through BN#18 are call appearances. Each call appearance or feature button has associated inuse and status lamps. For example, button BN#1 has associated in-use lamp 1038 and status lamp 1039. The in-use lamp is lit for a call appearance when that call appearance is the selected call appearance at the terminal. The status lamp is used to indicate the various stages of calls, e.g., alerting, active, etc., or to indicate the activation of feature buttons.

Each ISDN user terminal, e.g., 1030, transmits information to and receives information from switch 1000 (FIG. 5) in two 64 kilobits per second channels referred to as B-channels and in one 16 kilobits per second channel referred to as a D-channel. In the present embodiment, one B-channel is used to convey digitized voice samples at the rate of 8000, eight-bit samples per second and the other B-channel is used to convey data at a rate of 64 kilobits per second. (However, each B-channel could be used for either voice or data traffic.) Each B-channel is separately circuit-switched by switching network 1010 to other station equipment (either ISDN or analog). The D-channel is used both to convey signaling packets to effect message signaling between ISDN user terminals and control arrangement 1020, and to convey data packets between different ISDN user terminals. The D-channel is packet-switched by switching network 1010 either to other ISDN user terminals, or to control arrangement 1020 which controls the establishment of both circuit-switched calls and packet-switched calls within switch 1000.

In the present exemplary embodiment, information is conveyed between an ISDN user terminal, e.g., 1030, and switching arrangement 1000 via a four-wire, user access line 1031 using one pair of wires for each direction of transmission. User access line 1031 transmits a serial bit stream at the rate of 192 kilobits per second which comprises 144 kilobits per second for the above-mentioned two 64 kilobits per second B-channels and one 16 kilobits per second D-channel and which further comprises 48 kilobits per second used for a number of functions including framing, DC balancing, control and maintenance. User access line 1031 represents what is referred to by the International Telegraph and Telephone Consultative Committee (CCITT) as the T-interface. The use of the T-interface is only exemplary, however, as the invention is equally applicable to systems using other access methods.

Signaling packets are conveyed between the user terminals and control arrangement 1020 enclosed in level 2 (link-level) frames in accordance, for example, with the standard LAPD protocol. The exemplary signaling messages used for the control of circuit-switched voice calls are in accordance with CCITT Recommendation Q.931.

Figure 21:
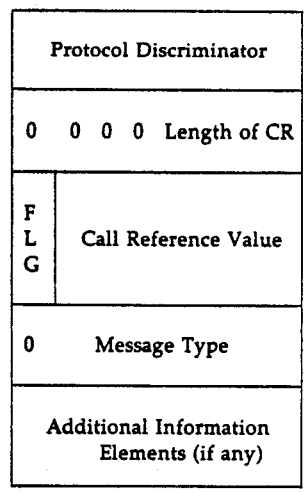
FIG. 21 is a diagram of the message format used for the illustrative signaling method of the invention.

The message format is shown in FIG. 21. The protocol discriminator is the first octet of every message. For the present example, the protocol discriminator 00001000 is used to define basic circuit-switched (circuit-mode) call control. The call reference typically comprises two octets coded as shown in FIG. 21. The first octet defines the number of octets following the octet defining the length of the call reference. Typically the first octet is coded as 00000001 indicating that only a single octet follows. The second octet includes the call reference and the call reference flag. In some cases, a 1-octet null call reference 00000000 is used. The purpose of the call reference is to define a particular call at the interface between the terminal and the switch. The third octet is used to define the message type. For example, the octet 00000001 defines an ALERTing message, the octet 01011010 defines a RELease COMPlete message and the octet 01111011 defines an INFOrmation message. The message type octet is followed by a number of information elements appropriate to the particular message type. Examples of such information elements are the bearer capability, call state, cause, channel identification, keypad, progress indicator, switchhook, and selected call appearance information elements.

The use of functional signaling messages in accordance with the functional signaling method of the prior art is illustrated by considering the following example of a standard voice call from user terminal 1030 to user terminal 1040. Assume for the purposes of this example only that each user terminal stores its own terminal configuration data. In accordance with the example, a user at terminal 1030 goes off-hook by lifting handset 1037. Terminal 1030 initially transmits a SETUP message (FIG. 7) to switch 1000. The SETUP message includes a call reference (CR) selected by terminal 1030. The selected CR is included in all subsequent signaling messages between terminal 1030 and switch 1000 concerning the particular call. Control arrangement 1020 of switch 1000 includes memory 3000 (FIG. 6), which may be implemented, for example, using a plurality of memories distributed throughout switch 1000, for storing both static and dynamic data needed for processing calls as well as a number of call processing programs. Control arrangement 1020 stores the received CR in a call record stored in a data table or relation in the dynamic data section of memory 3000. Switch 1000 then returns a SETUP ACK message (FIG. 7) to terminal 1030. The user at terminal 1030 then enters via keypad 1033 the destination directory number and terminal 1030 transmits a sequence of INFO messages each including one or more digits of the directory number. (Alternatively, all of the directory number digits may be included in the SETUP message.) Switch 1000 uses the received directory number as a key to translation data stored in memory 3000 and determines the identity of the terminating line 1041 for the call. Switch 1000 selects a CR for use in identifying the call in the signaling messages to be conveyed between switch 1000 and terminal 1040 and stores the selected CR in the call record of memory 3000. (Note that the CRs used for control communication with the originating and terminating terminals are in general different.) Switch 1000 also reads network 1010 path data stored in memory 3000 and, if a network 1010 path is available to be assigned to the call, switch 1000 transmits a SETUP message informing terminal 1040 of the incoming call. The SETUP message includes calling party identity information, e.g., the directory number assigned to line 1031 or, alternatively the name of the calling party if such information is available to switch 1000. Terminal 1040 visually displays such calling party identity information on display 1042. Switch 1000 also returns a CALL PROC message to station set 1030 indicating that a call is being set up in response to the received directory number. In response to the SETUP message, terminal 1040 enters an alerting state and begins ringing. Terminal 1040 then returns an ALERTING message to switch 1000, which message is also conveyed back to originating terminal 1030. Subsequently when the handset is lifted to answer the call, terminal 1040 transmits a CONNECT message to switch 1000, which effects the completion of the assigned network 1010 path and then transmits the CONNECT message on to terminal 1030. Switch 1000 also returns a CONNECT ACK message to terminal 1040. The two parties can now communicate.

The signaling method in accordance with the invention is illustrated herein by means of a number of exemplary call scenarios. The signaling diagram associated with each scenario is shown in corresponding FIGS. 1 through 3 and 6 through 18. The abbreviations used in the signaling diagrams are defined in Table 1.

TABLE 1

| | |
|---|---|
| BN# | - Button Number |
| CA | - Call Appearance |
| CR | - Call Reference |
| DA | - Destination Appearance information element |
| OCR | - Other Call Reference |
| FA | - Feature Activation information element |
| OCA | - Origination Call Appearance information element |
| SCA | - Selected Call Appearance information element |
| SWH | - Switchhook information element |

Figure 1:
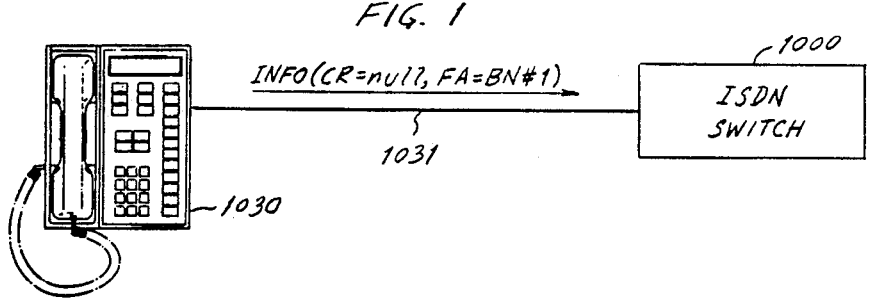
FIGS. 1 through 3 illustrate the signaling method of the invention for use between a switching system and a user terminal, where the user terminal is initially in a stimulus signaling mode and then responds to a message defining one of its buttons as the selected call appearance at the terminal by operating in a functional signaling mode to communicate with the system concerning a call at the selected call appearance.
Figure 2:
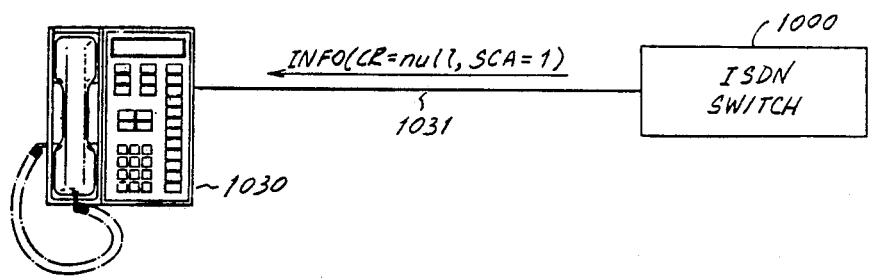
Figure 3:
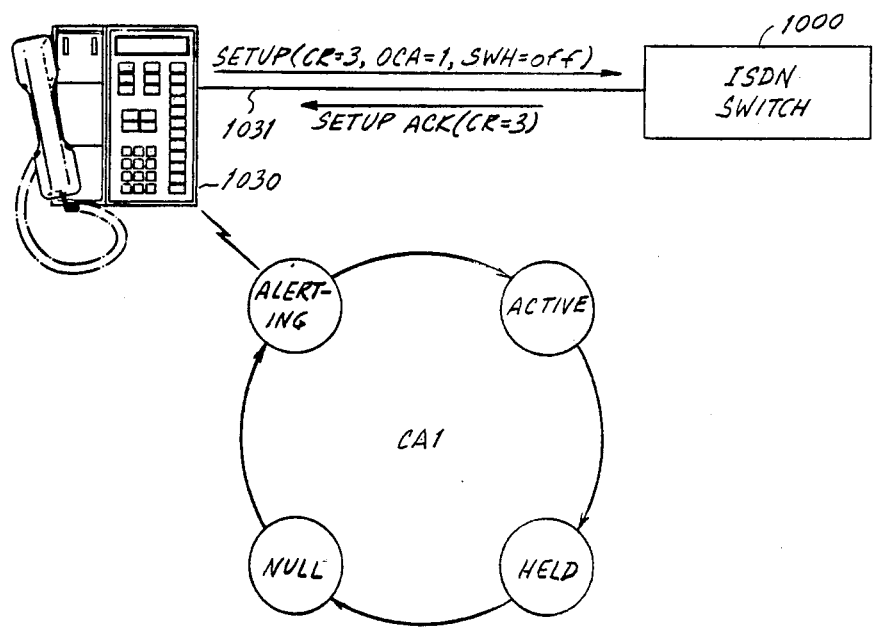

As the first example, consider that terminal 1030 is on-hook and a user activates button BN#1. Since terminal 1030 does not store terminal configuration data, it does not know the meaning associated with the activation of button BN#1. Terminal 1030 transmits an INFO message including the null call reference and a Feature Activation information element defining button BN#1 to switch 1000 (FIG. 1). At this point, terminal 1030 is operating in the stimulus signaling mode and the INFO message transmitted by terminal 1030 defining button BN#1 is a stimulus message. Switch 1000 reads the terminal configuration data stored in memory 3000 and determines that button BN#1 is a call appearance on terminal 1030. Switch 1000 returns an INFO message to terminal 1030 including the null call reference and a selected call appearance information element defining that button BN#1 is a call appearance and is selected on terminal 1030 (FIG. 2). In response to the selected call appearance, terminal 1030 begins operating in the functional signaling mode with respect to that call appearance. Terminal 1030 maintains at least four possible call states (Null, Alerting, Active and Held) for the call appearance and controls a traversal through the call states as a call from the selected call appearance progresses. When terminal 1030 subsequently goes off-hook, terminal 1030 transmits a SETUP message to switch 1000 (FIG. 3). The SETUP message is a functional message and includes information elements defining a call reference 3 selected by terminal 1030, the originating call appearance CA1, and the off-hook status of the switchhook. The particular message transmitted by terminal 1030 when it goes off-hook depends on the present call state of the selected call appearance as defined by Table 2.

TABLE 2

| State | Message |
|---|---|
| Null | SETUP |
| Alerting | CONN |
| Active | Not applicable |
| Held | RECONN |

Figure 7:
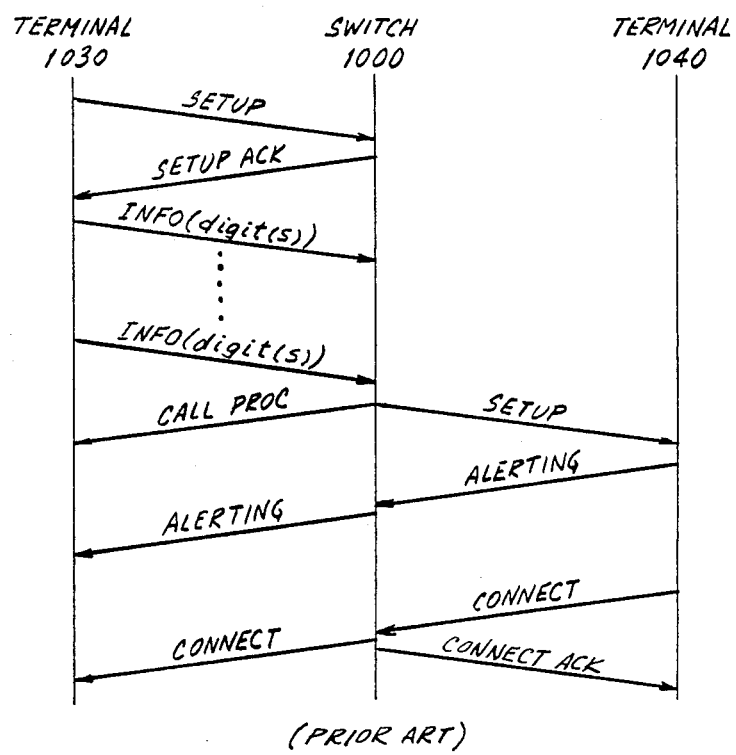
FIG. 7 is a message sequence diagram for a prior art functional signaling method.

Switch 1000 returns a SETUP ACK message to terminal 1030 and switch 1000 and terminal 1030 subsequently communicate using functional messages to initiate a call from call appearance CA1 in the manner shown in FIG. 7.

Next assume that an incoming call is received by switch 1000 and that switch 1000 reads the translation data and terminal busy/idle data stored in memory 3000 to determine that the call is to be completed to terminal 1030 and that call appearances CA1 and CA2 are both idle at terminal 1030 (FIG. 8). Switch 1000 transmits a SETUP message to terminal 1030 with information elements defining call reference 105 selected by switch 1000, defining button BN#1 as the destination call appearance for the incoming call, and defining button BN#2 as an idle selected call appearance. In response, call appearance CA1 begins alerting as indicated by the flashing of the status lamp and terminal 1030 returns an ALERT message to switch 1000. However, call appearance CA2 is the presently selected call appearance at terminal 1030 as indicated by the lighting of the in-use lamp. Accordingly, call appearance CA2 is in the Null state. When terminal 1030 subsequently goes off-hook, it transmits a SETUP message to switch 1000 including information elements defining a call reference 3 selected by terminal 1030, defining call appearance CA2 as the originating call appearance for a call, and defining the off-hook status of terminal 1030. Switch 1000 returns a SETUP ACK message to terminal 1030 and switch 1000 and terminal 1030 subsequently communicate using functional messages to initiate a call from call appearance CA2 in the manner shown in FIG. 7. The scenario just described is referred to as idle preference since even when terminal 1030 is instructed to begin alerting at a call appearance for an incoming call, a second appearance is selected such that a user that subsequently goes off-hook can initiate a call from the second call appearance.

The next example illustrates the manner in which idle preference can be overridden to answer the incoming call. Just as before, switch 1000 transmits a SETUP message to terminal 1030 with information elements defining call reference 105 selected by switch 1000, defining button BN#1 as the destination call appearance for the incoming call, and defining button BN#2 as an idle selected call appearance (FIG. 9). In response, call appearance CA1 begins alerting as indicated by the flashing of the status lamp and terminal 1030 returns an ALERT message to switch 1000. However call appearance CA2 is the presently selected call appearance at terminal 1030 as indicated by the lighting of the in-use lamp. Accordingly, call appearance CA2 is in the Null state. In this case, rather than going off-hook immediately as in FIG. 8, a user activates button BN#1 at terminal 1030. At this point, terminal 1030 is in the stimulus signaling mode with respect to call appearance CA1 since it is not the selected call appearance. Therefore terminal 1030 transmits a stimulus INFO message to switch 1000 including information elements defining the null call reference and defining the activation of button BN#1. Switch 1000 reads the terminal configuration data for terminal 1030 stored in memory 3000 and determines that button BN#1 is a call appearance. Switch 1000 then returns an INFO message to terminal 1030 including information elements defining the null call reference and defining button BN#1 as the selected call appearance at terminal 1030. Terminal 1030 can now operate in the functional signaling mode with respect to the selected call appearance CA1. Call appearance CA1 is in the ALERTING state. When terminal 1030 subsequently goes off-hook, terminal 1030 transmits a CONN message to switch 1000 including information elements defining call reference 105 and the off-hook state of terminal 1030. Switch 1000 returns a CONN ACK message to terminal 1030 and completes the network connection.

The next signaling scenario pertains to the provision of ringing preference rather than idle preference. In this case, switch 1000 responds to the incoming call by transmitting a SETUP message to terminal 1030 defining call reference 105 and defining button BN#1 both as the destination appearance for the call and as the selected call appearance (FIG. 10). In response, CA1 begins alerting as indicated by the flashing of the status lamp and becomes the selected call appearance as indicated by the in-use lamp. With ringing preference, when terminal 1030 becomes off-hook it simply transmits a CONN message to switch 1000 including information elements defining call reference 105 and the off-hook status of terminal 1030. Switch 1000 returns a CONN ACK message to terminal 1030 and completes the network connection.

When a particular call appearance is active and selected at a terminal, the activation of a second call appearance can result in the first call being dropped or alternatively, being placed on hold. The following scenario describes the auto-drop alternative. Assume that terminal 1030 is off-hook and that call appearance CA1 is active (with respect to a call having call reference 7)

and selected (FIG. 11). At this point, button BN#2 is activated at terminal 1030. Terminal 1030 transmits a stimulus INFO message to switch 1000 defining the null call reference and the activation of button BN#2 Switch 1000 reads the terminal configuration data stored in memory 3000 for terminal 1030 and determines that BN#2 is a call appearance. Since terminal 1030 is active on call appearance CA1, switch 1000 transmits a DISC message defining call reference 7 to terminal 1030 and clears the existing call. In response to the DISC message, terminal 1030 returns a REL message to switch 1000. After the network is cleared, switch 1000 returns a REL COM message to terminal 1030 including information elements defining the call reference 7 and defining button BN#2 as the selected call appearance. Terminal 1030 can now operate in the functional signaling mode with respect to the selected call appearance CA2. Since terminal 1030 is off-hook and in the Null state with respect to call appearance CA2, terminal 1030 transmits a SETUP message to switch 1000 defining a new call reference 5 and defining call appearance CA2 as the originating call appearance for the new call. Switch 1000 returns a SETUP ACK message to terminal 1030 and switch 1000 and terminal 1030 subsequently communicate using functional messages to initiate a call from call appearance CA2 in the manner shown in FIG. 7. In the auto-hold alternative, functional messages are exchanged to place the first call on hold, rather than dropping it.

The next example illustrates the signaling scenario when another terminal engaged in a call with terminal 1030 disconnects. Terminal 1030 is off-hook and call appearance CA1 is active (with respect to call reference 7) and selected (FIG. 12). Switch 1000 detects the far-end disconnection and transmits a DISC message to terminal 1030 defining call reference 7. Terminal 1030 and switch 1000 exchange REL and REL COM messages as the network connection is cleared. The REL COM message transmitted by switch 1000 to terminal 1030 includes a null selected call appearance information element. In response, the in-use lamp associated with call appearance CA1 is extinguished at terminal 1030. When terminal 1030 subsequently goes on-hook, terminal 1030 transmits a stimulus INFO message to switch 1000 defining the null call reference and the on-hook status of terminal 1030. In response, switch 1000 reads memory 3000 to determine an idle call appearance, e.g., button BN#1, at terminal 1030. Switch 1000 includes a selected call appearance information element defining button BN#1 in a stimulus INFO message transmitted to terminal 1030. In response, the in-use lamp associated with call appearance CA1 is again lit indicating that call appearance CA1 is again selected at terminal 1030.

The signaling scenario when terminal 1030 disconnects from a call is shown in FIG. 13. Terminal 1030 is off-hook and call appearance CA1 is active (with respect to call reference 7) and selected. At this point, terminal 1030 goes on-hook. Since call appearance CA1 is the selected call appearance, terminal 1030 transmits the functional DISC message to switch 1000 defining call reference 7 and the on-hook state of terminal 1030. Switch 1000 includes a selected call appearance information element defining button BN#1 in the REL message returned to terminal 1030. Accordingly, the inuse lamp associated with CA1 remains lit indicating that call appearance CA1 is still the selected call appearance. Call appearance CA1 is in the Null state. Terminal 1030 then returns a REL COM message to switch 1000.

The use of the HOLD button BN#7 is illustrated by the next signaling scenario. Assume that terminal 1030 is off-hook and that call appearance CA1 is active (with respect to call reference 7) and selected (FIG. 14). A user at terminal 1030 activates the HOLD button BN#7. Since terminal 1030 is in the functional signaling mode with respect to the selected call appearance CA1, terminal 1030 transmits a HOLD message defining call reference 7 to switch 1000. Switch 1000 returns a HOLD ACK message to terminal 1030 including a null selected call appearance information element. In response, terminal 1030 returns to the stimulus signaling mode with respect to call appearance CA1. The user at terminal 1030 then activates button BN#1 and terminal 1030 responds by transmitting a stimulus INFO message to switch 1000 defining a null call reference and defining the activation of button BN#1. Switch 1000 reads the terminal configuration data for terminal 1030 stored in memory 3000 and determines that button BN#1 is a call appearance on terminal 1030. Switch 1000 returns an INFO message to terminal 1030 including the null call reference and a selected call appearance information element defining that button BN#1 is a call appearance and is selected on terminal 1030. Since terminal 1030 is off-hook and call appearance CA1 is in the Held state, terminal 1030 responds to the call appearance selection by transmitting a RECONN message to switch 1000 defining call reference 7. Switch 1000 removes the call from hold and returns a RECONN ACK message to terminal 1030 defining call reference 7.

The use of the DROP button BN#8 is illustrated by the next two signaling scenarios. First, assume that terminal 1030 is off-hook and call appearance CA1 is active (with respect to call reference 7) and selected (FIG. 15). Also assume that terminal 1030 is not the controller of a conference call. Since terminal 1030 is in the functional signaling mode with respect to the selected call appearance CA1, the activation of the DROP button by a user at terminal 1030 results in the transmission of a DROP message from terminal 1030 to switch 1000 defining call reference 7. Switch 1000 responds by clearing the network 1010 path used for the active call and returning a DISC message to terminal 1030. Terminal 1030 and switch 1000 then exchange REL and REL COM messages. The REL COM message transmitted from switch 1000 to terminal 1030 includes a selected call appearance information element defining call appearance CA1 as the selected call appearance. Accordingly, the in-use lamp associated with CA1 remains lit indicating that call appearance CA1 is still the selected call appearance. Call appearance CA1 is in the Null state. Since terminal 1030 is still off-hook, terminal 1030 transmits a functional SETUP message to switch 1030 defining a new call reference 13 and defining call appearance CA1 as the originating call appearance. Switch 1000 returns a SETUP ACK message to terminal 1030 and switch 1000 and terminal 1030 subsequently communicate using functional messages to initiate a call from call appearance CA1 in the manner shown in FIG. 7.

When terminal 1030 is the controller of a conference call, the activation of the DROP button acts to drop the last added party to the conference. As before, assume that terminal 1030 is off-hook and call appearance CA1 is active (with respect to call reference 7) and selected (FIG. 16). Since terminal 1030 is in the functional signaling mode with respect to the selected call appearance CA1, the activation of the DROP button by a user at terminal 1030 results in the transmission of a DROP message from terminal 1030 to switch 1000 defining call reference 7. Switch 1000 responds by dropping the last party added to the conference and returning a DROP ACK message to terminal 1030.

The remaining signaling scenarios deal with the establishment of conference calls. Assume again that terminal 1030 is off-hook and that call appearance CA1 is active (with respect to call reference 7) and selected. Terminal 1030 is in the functional signaling mode with respect to call appearance CA1. Therefore, when a user at terminal 1030 activates the CONFERENCE button BN#9, terminal 1030 transmits a CONF message to switch 1000 defining call reference 7. Switch 1000 determines that this is the first activation of the CONFERENCE button at terminal 1030 and acts to place call appearance CA1 on hold. Switch 1000 also selects an idle call appearance at terminal 1030 to be used for the second leg of the conference call. Switch 1000 includes the selected call appearance information element defining call appearance CA2 in a HOLD ACK message returned to terminal 1030. The in-use lamp for call appearance CA2 is lit and call appearance CA2 is in the null state. Since terminal 1030 is off-hook and in the functional signaling mode with respect to call appearance CA2, terminal 1030 transmits a functional SETUP message defining a new call reference 61 and defining call appearance CA2 as the originating call appearance. A standard origination occurs and when the second leg is completed, switch 1000 returns a CONN message to terminal 1030 defining call reference 61. At this point, the user at terminal 1030 activates the CONFERENCE button BN#9 for the second time and terminal 1030 transmits a CONF message to switch 1000 defining call reference 61. Switch 1000 responds to the receipt of the second CONF message from terminal 1030 by completing a conference to the held call. Switch 1000 then transmits a CONF ACK message to terminal 1030 defining call reference 61 and also defining call reference 7 as the other call reference. Switch 1000 and terminal 1030 then exchange DISC, REL, and REL COM messages to disconnect the second call from terminal 1030. The REL COM message from switch 1000 includes a selected call appearance information element defining call appearance CA1 as the new selected call appearance at terminal 1030. Since call appearance CA1 is in the HELD state, terminal 1030 responds to the REL COM message by transmitting a RECONN message to switch 1000 defining the initial call reference. Switch 1000 responds with a RECONN ACK message. The conference procedure just described is referred to as an implicit conference. The conference merger is effected to the held call. A slightly different conference scenario is shown in FIG. 18 where the merger is effected to the active call rather than the held call. Thus the held call (with call reference 7) is disconnected rather than the active call (with call reference 61).

The next conference scenario is referred to as explicit conferencing and the signaling diagram is shown in FIG. 19. Again assume that terminal 1030 is initially off-hook with call appearance CA1 active (with respect to call reference 7) and selected. In this scenario, a user at terminal 1030 activates the HOLD button BN#7. Since terminal 1030 is in the functional signaling mode with respect to call appearance CA1, terminal 1030 transmits a HOLD message to switch 1000 defining call reference 7. Switch 1000 places call appearance CA1 on hold and returns a HOLD ACK message to terminal 1030 including a null selected call appearance information element. In response, terminal 1030 places call appearance CA1 on hold, but since no call appearance is selected, returns to the stimulus signaling mode. A user at terminal 1030 subsequently activates button BN#2. Terminal 1030 transmits a stimulus INFO message with information elements defining the null call reference and the activation of button BN#2. Switch 1000 reads the terminal configuration data stored in memory 3000 and determines that button BN#2 is a call appearance on terminal 1030. Switch 1000 returns an INFO message to terminal 1030 including the null call reference and a selected call appearance information element defining that BN#2 is a call appearance and is selected on terminal 1030. In response to the selected call appearance, terminal 1030 begins operating in the functional signaling mode with respect to that call appearance. Since call appearance CA2 is in the Null state and terminal 1030 is off-hook, terminal 1030 transmits a functional SETUP message to switch 1000 defining a new call reference 61 and defining call appearance CA2 as the originating call appearance. A standard origination sequence follows concluding with the transmission of a CONN message from switch 1000 to terminal 1030. At this point, a user at terminal 1030 activates the CONFERENCE button. In response, terminal 1030 transmits a CONF message to switch 1000 defining the call reference 61 and also defining the other call reference 7. Switch 1000 responds by completing the desired conference connection and then returning a CONF ACK message to terminal 1030. Switch 1000 and terminal 1030 then exchange DISC, REL, and REL COM messages to disconnect the second call (having call reference 61) at terminal 1030. The REL COM message transmitted from switch 1000 to terminal 1030 includes a selected call appearance information element defining CA1 as the selected call appearance. Since call appearance CA1 is in the Held state and terminal 1030 remains off-hook, terminal 1030 transmits a RECONN message to switch 1000 defining the original call reference 7. Switch 1000 responds with a RECONN ACK message to terminal 1030. FIG. 20 is the signaling diagram for a similar explicit conference scenario except that rather than merging to the held call as in FIG. 19, the merger is effected to the current call. Note that with explicit conferencing, the terminal explicitly defines which call will be merged into the conference using the Other Call Reference (OCR) information element.

It is to be understood that the above-described signaling arrangement is merely illustrative of the principles of the present invention and that many variations may be devised by those skilled in the art without departing from the spirit and scope of the invention.

What is claimed is:

1. A signaling method for use between a switching system and a user terminal in controlling calls to and from said terminal, where said terminal has a plurality of buttons and is operable in a stimulus signaling mode and a functional signaling mode and said system stores data defining at least one of said buttons as a call appearance, said method comprising said terminal operating in said stimulus signaling mode to communicate with said system using stimulus messages, said system transmitting a message to said terminal defining said at least one button as the selected call appearance at said terminal and said terminal responding to said message by operating in said functional signaling mode to communicate with said system using functional messages concerning a call at said selected call appearance.

2. A method of initiating calls from one of a plurality of terminals served by a switching system, where each of said terminals has a plurality of buttons and said system includes memory means storing data defining for each of said terminals, certain ones of the buttons of that terminal as call appearances, said method comprising said one terminal, in response to an activation of one of the buttons of said one terminal, transmitting a first message to said system defining said activated button, said system reading said stored data in response to said first message to determine whether said activated button is a call appearance, upon determining that said activated button is a call appearance, said system transmitting a second message to said one terminal defining said activated button as the selected call appearance at said terminal, and in response to said second message, said one terminal and said system exchanging functional messages to initiate a call from said selected call appearance.

3. A signaling method for use between a switching system and a user terminal in controlling calls, where said terminal has a plurality of buttons and can assume on-hook and off-hook conditions and where said system stores data defining certain ones of said buttons as call appearances and defining the busy/idle status of said call appearances, said method comprising said system, in response to an incoming call, reading said stored data to determine two idle ones of said call appearance buttons, said system transmitting a message to said terminal defining one of said determined call appearance buttons as the destination call appearance for said incoming call and defining the other one of said determined call appearance buttons as the selected call appearance at said terminal and said terminal responding to said message and to an off-hook condition of said terminal, by exchanging functional messages with said system to initiate an outgoing call from said selected call appearance.

4. A signaling method for use between a switching system and a user terminal in controlling calls, where said terminal has a plurality of buttons and can assume on-hook and off-hook conditions and where said system stores data defining certain ones of said buttons as call appearances and defining the busy/idle status of said call appearances, said method comprising said system, in response to an incoming call, reading said stored data to determine two idle ones of said call appearance buttons, said system transmitting a first message to said terminal defining a first one of said determined call appearance buttons as the destination call appearance for said incoming call and defining a second one of said determined call appearance buttons as the selected call appearance at said terminal, said terminal responding to said first message and to an activation of said first determined call appearance button by transmitting a second message to said system defining said activated button, said system reading said stored data in response to said second message to determine whether said activated button is a call appearance, upon determining that said activated button is a call appearance, said system transmitting a third message to said terminal defining said activated button as the selected call appearance at said terminal and said terminal responding to said third message and to an off-hook condition of said terminal, by exchanging functional messages with said system to terminate said call to said selected call appearance defined by said third message.

5. A signaling method for use between a switching system and a user terminal in controlling calls, where said terminal has a plurality of buttons and can assume on-hook and off-hook conditions and where said system stores data defining certain ones of said buttons as call appearances and defining the busy/idle status of said call appearances, said method comprising said system, in response to an incoming call, reading said stored data to determine an idle one of said call appearance buttons, said system transmitting a message to said terminal defining said determined call appearance button as the destination call appearance for said incoming call and as the selected call appearance at said terminal and said terminal responding to said message and to an off-hook condition of said terminal, by exchanging functional messages with said system to terminate said incoming call to said selected call appearance.

6. A signaling method for use between a switching system and a user terminal in controlling calls, where said terminal has a plurality of buttons and can assume on-hook and off-hook conditions and where said system stores data defining certain ones of said buttons as call appearances and defining the busy/idle status of said call appearances, said method comprising the steps of:

(A) when said terminal is off-hook and a first one of said call appearance buttons is selected at said terminal and is active on a first call, said terminal responding to an activation of a second one of said call appearance buttons by transmitting a first message to said system defining said activated button, (B) said system reading said stored data in response to said first message to determine whether said activated button is a call appearance, (C) upon determining that said activated button is a call appearance, said system transmitting a second message to said terminal defining said activated button as the selected call appearance at said terminal, and (D) in response to said second message, said terminal and said system exchanging functional messages to initiate a second call from said selected call appearance defined by said second message.

7. A method in accordance with claim 6 wherein said step (C) further comprises upon determining that said activated button is a call appearance, said system and said terminal exchanging functional messages to disconnect said first call.

8. A method in accordance with claim 6 wherein said step (C) further comprises upon determining that said activated button is a call appearance, said system and said terminal exchanging functional messages to place said first call on hold.

9. A signaling method for use between a switching system and a user terminal in controlling calls, where said terminal has a plurality of buttons and can assume on-hook and off-hook conditions and where said system stores data defining certain ones of said buttons as call appearances and defining the busy/idle status of said call appearances, said method comprising when said terminal is off-hook and one of said call appearance buttons is selected at said terminal and is active on a call, said system responding to a far-end disconnection of said call by exchanging functional messages with said terminal to disconnect said call at said selected call appearance including a first message transmitted from said system to said terminal defining that none of said call appearances is selected at said terminal, said terminal responding to said first message and to an on-hook condition of said terminal by transmitting a second message to said system defining said on-hook condition, said system responding to said second message by reading said stored data to determine an idle one of said call appearances and said system transmitting a third message to said terminal defining said determined idle call appearance as the selected call appearance at said terminal.

10. A signaling method for use between a switching system and a user terminal in controlling calls, where said terminal has a plurality of buttons and can assume on-hook and off-hook conditions and where said system stores data defining certain ones of said buttons as call appearances and defining the busy/idle status of said call appearances, said method comprising when said terminal is off-hook and one of said call appearance buttons is selected at said terminal and is active on a call, said terminal responding to an on-hook condition of said terminal by transmitting a first functional message to said system to disconnect said call, said system responding to said first message by reading said stored data to determine an idle one of said call appearances, and said system and said terminal exchanging functional messages to complete the disconnection of said call including a second functional message transmitted from said system to said terminal defining said determined idle call appearance as the selected call appearance at said terminal.

11. A signaling method for use between a switching system and a user terminal in controlling calls, where said terminal has a plurality of buttons including a HOLD button and can assume on-hook and off-hook conditions and where said system stores data defining certain ones of said buttons as call appearances and defining the busy/idle status of said call appearances, said method comprising when said terminal is off-hook and one of said call appearance buttons is selected at said terminal and is active on a call, said terminal responding to an activation of said HOLD button by transmitting a first functional message to said system requesting that said call be placed on hold, said system transmitting a second functional message to said terminal defining that none of said call appearances is selected at said terminal, said terminal responding to said second functional message and to an activation of said one call appearance button by transmitting a first stimulus message to said system defining said activated button, said system reading said stored data to determine whether said activated button is a call appearance, upon determining that said activated button is a call appearance, said system transmitting a second stimulus message to said terminal defining said activated button as the selected call appearance at said terminal and in response to said second stimulus message, said terminal and said switch exchanging functional messages to reconnect said call.

12. A signaling method for use between a switching system and a user terminal in controlling calls, where said terminal has a plurality of buttons including a DROP button and can assume on-hook and off-hook conditions and where said system stores data defining certain ones of said buttons as call appearances and defining the busy/idle status of said call appearances, said method comprising when said terminal is off-hook and one of said call appearance buttons is selected at said terminal and is active on a first call, said terminal responding to an activation of said DROP button by transmitting a first functional message to said system requesting that said first call be dropped, said system responding to said first functional message by reading said stored data to determine an idle call appearance, said system and said terminal exchanging functional messages to disconnect said first call including a second functional message from said system to said terminal defining said idle call appearance as the selected call appearance at said terminal and in response to said second functional message, said terminal and said system exchanging functional messages to initiate a second call from said selected call appearance defined by said second functional message.

13. A signaling method for use between a switching system and a user terminal in controlling calls, where said terminal has a plurality of buttons including a CONFERENCE button and can assume on-hook and off-hook conditions and where said system stores data defining certain ones of said buttons as call appearances and defining the busy/idle status of said call appearances, said method comprising when said terminal is off-hook and one of said call appearance buttons is selected at said terminal and is active on a first call, said terminal responding to an activation of said CONFERENCE button by transmitting a first functional message to said system requesting a conference, said system responding to said first functional message by placing said first call on hold and reading said stored data to determine an idle one of said call appearances, said system transmitting a second functional message to said terminal defining said determined call appearance as the selected call appearance for the second leg of said conference, in response to said second functional message, said terminal and said system exchanging functional messages to originate a second call from said determined call appearance and once said second call origination has been completed, said terminal responding to a second activation of said CONFERENCE button by exchanging functional messages with said system to merge said first and second calls to form said conference.

14. A signaling method for use between a switching system and a user terminal in controlling calls, where said terminal has a plurality of buttons including a HOLD button and a CONFERENCE button and can assume on-hook and off-hook conditions and where said system stores data defining certain ones of said buttons as call appearances and defining the busy/idle status of said call appearances, said method comprising when said terminal is off-hook and a first one of said call appearance buttons is selected at said terminal and is active on a first call, said terminal responding to an activation of said HOLD button by transmitting a first functional message to said system requesting that said first call be placed on hold, said system responding to said first functional message by placing said first call on hold and transmitting a second functional message to said terminal defining that none of said call appearances is selected at said terminal, said terminal responding to said second functional message and to an activation of a second one of said call appearance buttons by transmitting a first stimulus message to said system defining said activated button, said system responding to said first stimulus message by reading said stored data to determine whether said activated button is an idle call appearance, upon determining that said activated button is an idle call appearance, said system transmitting a second stimulus message to said terminal defining said activated button as the selected call appearance at said terminal, said terminal responding to said second stimulus message by exchanging functional messages with said system to originate a second call from said selected call appearance defined by said second stimulus message, once said second call origination has been completed, said terminal responding to an activation of said CONFERENCE button by exchanging functional messages with said system to merge said first and second calls to form a conference.

15. A signaling method for use by a user terminal served by a switching system, where said terminal has a plurality of buttons, said method comprising in response to an activation of one of said buttons, transmitting a first message to said system defining said activated button, receiving a second message defining said activated button as the selected call appearance at said terminal, and in response to said second message, transmitting a functional message to said system to initiate a call from said selected call appearance.

16. A signaling method for use by a switching system serving a user terminal having a plurality of buttons, where said system includes memory means storing data defining certains ones of said buttons as call appearances, said method comprising receiving a first message from said terminal defining an activated one of said buttons, reading said stored data in response to said first message to determine whether said activated button is a call appearance, upon determining that said activated button is a call appearance, transmitting a second message to said terminal defining said activated button as the selected call appearance at said terminal, and receiving a functional message from said terminal defining the initiation of a call from said selected call appearance.

17. A user terminal for use with a switching system, said terminal comprising a plurality of buttons, means responsive to an activation of one of said buttons for transmitting a first message to said system defining said activated button, means for receiving a second message defining said activated button as the selected call appearance at said terminal, and means responsive to said second message for transmitting to said system a functional message to initiate a call from said selected call appearance.

18. A switching system serving a user terminal having a plurality of buttons comprising memory means storing data defining certain ones of said buttons as call appearances, means for receiving a first message from said terminal defining an activated one of said buttons, means for reading said stored data in response to said first message to determine whether said activated button is a call appearance, means responsive to a determination that said activated button is a call appearance for transmitting a second message to said terminal defining said activated button as the selected call appearance at said terminal, and means for receiving a functional message from said terminal defining the initiation of a call from said selected call appearance.

19. A signaling method for use by a user terminal in controlling calls to and from a switching system, where said terminal has a plurality of buttons and is operable in a stimulus signaling mode and a functional signaling mode and where said system stores data defining at least one of said buttons as call appearance, said method comprising operating in said stimulus mode to communicate with said system using stimulus messages, receiving a message from said system defining said at least one button as the selected call appearance at said terminal and responding to said message by operating in said functional signaling mode to communicate with said system using functional messages concerning a call at said selected call appearance.

20. A signaling method for use by a user terminal in controlling calls to and from a switching system, where said terminal has a plurality of buttons and can assume on-hook and off-hook conditions and where said system stores data defining certain ones of said buttons as call appearances and defining the busy/idle status of said call appearances, said method comprising receiving a message from said switching system defining one of said buttons as the destination call appearance for an incoming call and defining another one of said buttons as the selected call appearance at said terminal and responding to said message and to an off-hook condition of said terminal by sending a functional message to said system to initiate an outgoing call from said selected call appearance.

21. A signaling method for use by a user terminal in controlling calls to and from a switching system, where said terminal has a plurality of buttons and can assume on-hook and off-hook conditions and where said system stores data defining certain ones of said buttons as call appearances and defining the busy/idle status of said call appearances, said method comprising receiving a message from said system defining one of said buttons as the destination call appearance for an incoming call and as the selected call appearance at said terminal and responding to said messnage and to an off-hook condition of said terminal by sending a functional message to said system to terminate said incoming call to said selected call appearance.

22. A signaling method for use by a user terminal in controlling calls to and from a switching system, where said terminal has a plurality of buttons and can assume on-hook and off-hook conditions and where said system stores data defining certain ones of said buttons as call appearances and defining the busy/idle status of said call appearances, said method comprising responding, when said terminal is off-hook and a first one of said call appearance buttons is selected at said terminal and is active on a first call, to an activation of a second one of said call appearance buttons by transmitting a first message to said system defining said activated button, receiving a second message from said switching system defining said activated button as the selected call appearance at said terminal, and in response to said second message, sending a functional message to initiate a second call from said selected call appearance defined by said second message.

23. A method in accordance with claim 22 wherein said method further comprises after transmitting said first message and before receiving said second message, receiving a message from said switching system to disconnect said first call.

24. A method in accordance with claim 22 wherein said method further comprises after transmitting said first message and before receiving said second message, receiving a message from said switching system to place said first call on hold.

25. A signaling method for use by a switching system in controlling calls to and from a user terminal, where said terminal has a plurality of buttons and is operable in a stimulus signaling mode and a functional signaling mode and said system stores data defining at least one of said buttons as a call appearance, said method comprising receiving a stimulus signaling message from said terminal, transmitting a message to said terminal defining said at least one button as the selected call appearance at said terminal and after said transmitting step, receiving from said terminal a functional signaling message concerning a call at said call appearance.

26. A signaling method for use by a switching system in controlling calls to and from a user terminal, where said terminal has a plurality of buttons and can assume on-hook and off-hook conditions and where said system stores data defining certain ones of said buttons as a call appearances and defining the busy/idle status of said call appearance, said method comprising reading said stored data, in response to an incoming call, to determine two idle ones of said call appearance buttons, transmitting a message from said terminal defining one of said determined call appearance buttons as the destination call appearance for said incoming call and defining the other one of said determined call appearance buttons as the selected call appearance at said terminal and after said transmitting step, receiving a functional message from said terminal to initiate an outgoing call from said selected call appearance.

27. A signaling method for use by a switching system in controlling calls to and from a user terminal, where said terminal has a plurality of buttons and can assume on-hook and off-hook conditions and where said system stores data defining certain ones of said buttons as call appearances and defining the busy/idle status of said call appearances, said method comprising reading said stored data, in response to an incoming call, to determine an idle one of said call appearance buttons, transmitting a message to said terminal defining said determined call appearance button as the destination call appearance for said incoming call and as the selected call appearance at said terminal and after said transmitting step, receiving a functional message from said terminal to terminate an incoming call to said selected call appearance.

28. A signaling method for use by a switching system in controlling calls to and from a user terminal, where said terminal has a plurality of buttons and can assume on-hook and off-hook conditions and where said system stores data defining certain ones of said buttons as call appearances and defining the busy/idle status of said call appearances, said method comprising the steps of:

(A) when said terminal is off-hook and a first one of said call appearance buttons is selected at said terminal and is active on a first call, said system receiving a first message from said terminal defining the activation of a second one of said call appearance buttons, (B) said system reading said stored data in response to said first message to determine whether said activated button is a call appearance, (C) upon determining that said activated button is a call appearance, said system transmitting a second message to said terminal defining said activated button as the selected call appearance at said terminal, and (D) after step (C), said system receiving a functional message from said terminal, to initiate a second call from said selected call appearance defined by said second message.

29. A method in accordance with claim 22 wherein step (C) further comprises upon determining that said activated button is a call appearance, said system sending a functional message to said terminal to disconnect said first call.

30. A method in accordance with claim 28 wherein step (C) further comprises upon determining that said activated button is a call appearance, said system sending a functional message to said terminal to place said first call on hold.

* * * * *